United States Patent
Regard

(10) Patent No.: US 7,248,164 B2
(45) Date of Patent: Jul. 24, 2007

(54) RADIO FREQUENCY IDENTIFICATION BAG TRACKING AND RECYCLING SYSTEM, AND BAG COUNTING RACK ASSOCIATED THEREWITH

(76) Inventor: Joseph T. Regard, P.O. Box 838, Madisonville, LA (US) 70447-0838

(\*) Notice: Subject to any disclaimer, the term of this patent is extended or adjusted under 35 U.S.C. 154(b) by 156 days.

(21) Appl. No.: 11/053,317

(22) Filed: Feb. 7, 2005

(65) Prior Publication Data

US 2006/0187058 A1    Aug. 24, 2006

(51) Int. Cl.
*G08B 13/14*   (2006.01)
(52) U.S. Cl. ................ 340/568.5; 340/572.1; 340/572.4
(58) Field of Classification Search ............ 340/572.3, 340/568.1, 568.5, 568.7, 568.8, 572.1, 572.4
See application file for complete search history.

(56) References Cited

U.S. PATENT DOCUMENTS

| | | | |
|---|---|---|---|
| 6,549,119 B1* | 4/2003 | Turner ................. | 340/10.5 |
| 6,681,896 B1 | 1/2004 | Davis | |
| 6,693,539 B2* | 2/2004 | Bowers et al. .......... | 340/572.1 |
| 7,044,373 B1* | 5/2006 | Garber et al. ............. | 235/385 |
| 2001/0029724 A1* | 10/2001 | DeMatteis ................ | 53/459 |
| 2003/0206107 A1* | 11/2003 | Goff et al. .............. | 340/572.7 |
| 2004/0026134 A1 | 2/2004 | Waggoner et al. | |
| 2005/0068182 A1* | 3/2005 | Dunlap et al. ........... | 340/572.8 |
| 2006/0103532 A1* | 5/2006 | Van Fleet ............... | 340/572.1 |

\* cited by examiner

Primary Examiner—Jeffery Hofsass
Assistant Examiner—Edny Labbees
(74) Attorney, Agent, or Firm—Joseph T. Regard, Ltd plc

(57) ABSTRACT

An RFID-based system for tracking, managing, dispensing and recycling bags, particularly retail and grocery-type bags such as t-shirt bags and the like. The preferred embodiment of the present invention contemplates a system wherein there is employed at a T-Shirt bag fabrication facility an RFID tag dispensing system for affixing an RFID tag to the thermoplastic film utilized in forming a T-shirt bag, which bag is formed into a stack. The RFID tag is associated with the bag at the time of manufacture, and information pertaining to said bag is saved in a central computer, which is subsequently used in shipping and management of the bag(s). A sensor bag rack is provided for supporting the bag pack during dispensing and use of the bags at the checkout counter, which supports the bag during loading and is configured to relay data on said bag as it is removed from the rack for placement in the customers cart, or otherwise provided to the customer. An alternative system contemplates a sensor which counts the bags at they are removed from the rack and compiles the number of bags per customer per transaction, which is used to calculate the deposit to be charged the customer for the bags used. Data on the number of bags used in bagging of the customers goods is thereby provided, which maybe used to calculate a deposit for each bag, which is charged to the customer. The customer may also be associated with each bag for compiling subsequent data on recycling of said bags. Lastly, the present invention contemplates a recycling bin which incorporates an RFID scanner to scan a collection of bags simultaneously as they are returned by the user, utilizing the data to calculate a refund due the customer.

30 Claims, 3 Drawing Sheets

RADIO FREQUENCY IDENTIFICATION BAG TRACKING AND RECYCLING SYSTEM, AND BAG COUNTING RACK ASSOCIATED THEREWITH

TECHNICAL FIELD OF THE INVENTION

The present invention relates to radio frequency identification (RFID) technologies, and in particular to an RFID-based system for tracking, managing, dispensing and recycling bags, particularly retail and grocery-type bags such as t-shirt bags and the like.

The preferred embodiment of the present invention contemplates a system wherein there is employed at a T-Shirt bag fabrication facility an RFID tag dispensing system configured to affix or otherwise incorporate an RFID tag to the thermoplastic film utilized in forming a T-shirt bag, which bag is formed into a stack.

The RFID tag is associated with the bag at the time of manufacture, and information pertaining to said bag is saved in a central computer, which is subsequently used in shipping and management of the bag(s).

A sensor bag rack is provided for supporting the bag pack during dispensing and use of the bags at the checkout counter, which supports the bag during loading and is configured to relay data on said bag as it is removed from the rack for placement in the customers cart, or otherwise provided to the customer.

An alternative embodiment of the bag rack of the present invention contemplates a sensor which counts the bags at they are removed from the rack and compiles the number of bags per customer per transaction, which is used to calculate the deposit to be charged the customer for the bags used.

Data on the number of bags used in bagging of the customers goods is thereby provided, which maybe used to calculate a deposit for each bag, which is charged to the customer. The customer may also be associated with each bag for compiling subsequent data on recycling of said bags.

Lastly, the present invention contemplates a recycling bin which incorporates an RFID scanner to scan a collection of bags simultaneously as they are returned by the user, utilizing the data to calculate a refund due the customer.

BACKGROUND OF THE INVENTION

The use of RFID tags has significantly increased recently, as costs of the tags and associated equipment has plumitted. Radio Frequency Identification (RFID) tags are used to track products, as well as other uses such as toll tags and animal identification.

A typical RFID tag requires no battery as it utilizes the energy of the scanner, the tag acting as a transponder to relay generally basic identification information, which information is used for tracking via a central computer.

On another front, with enhanced environmental awareness, local and regional governments have discussed implementing deposits on thermoplastic grocery bags or the like, to raise revenues as well as discourage littering, while encouraging recycling.

However, a typical customer can utilize literally dozens of bags every month, typically placing the bags in one of the bags. Thus many of the grocery bags can be stuffed in a single bag. By the time a customer gets to a recycling area to return the bags, there may be literally hundreds of bags stuffed in several of the bags.

It would not be cost or time effective for an employee of the recipient of the bags to sort through and count each bag in the collection of bags returned. Further, the deposit to be returned to the customer must be calculated and refunded to the client. Also, the deposit for the bag may vary depending upon the jurisdiction and use, and there is no easy, fast, cost effective means of determining the deposit paid upon the bag. A jurisdiction refunding a fixed deposit price on all t-shirt bags could find itself paying monies under the guise of deposit refunds on bags which had not deposit paid thereon, or bags which had a lesser deposit paid than the intended bags for that jurisdiction.

It is believed there is no automated system for receiving, counting, identifying, calculating, and refunding the deposit, thus at this point a deposit return scheme is believed impractical due to the operational costs utilizing the above discussed manual, non-automated techniques.

GENERAL SUMMARY DISCUSSION OF THE INVENTION

Unlike the prior art, the present invention provides an automated means of tracking t-shirt grocery bags from manufacture to recycling, providing a system for calculating deposits on the bags during a retail transaction utilizing said bags, and providing an automated means to receive, count, calculate and refund to the customer said deposit, while providing information on said customer.

In the exemplary embodiment of the present invention, an RFID tag dispensing device affixes an RFID tag on a length of plastic film utilized to form a t-shirt bag, the bag collected with other bags and formed into a bag stack, which is then packed for shipping. Data on the bags is then compiled into a central computer, which may relay said data to the store for subsequent use.

The bags are then received by the store warehouse, where they may be tracked via the RFID tags for storage and subsequent retrieval when ready for use, at which time said stacks of bags are provided to the check-out stand associated with the store.

The bag stacks are placed upon a rack, where the bag on the top (now forward) portion of the stack is individually filled. A sensor associated with the rack scans the RFID tag on said bag and associates said bag with the customer. Each bag removed from the rack during customer checkout is associated with said customer, said data used, among other things, to compute the amount of deposit to be charged to the customer, which is added to the receipt and charged to the customer at the completion of checkout.

An alternative rack of the present invention utilizes a sensor such as, for example, a pressure switch located in the base of the rack, swich associated with the support arm of the rack, a proximity switch, or other means to disern removal of a bag from the rack (of which there are several), which is counted by a computer for calculating total deposit to be charged to the customer, the alternative system not relying upon RFID tags for discerning the removal and use of the bag.

Under such a non-tag scheme, a bar code or other indicator could be printed upon the bag identifying the bag and verifying the source. Under such a scheme, each bag would ideally have its own proprietary bar code for ID purposes, to verify refund of deposit for that particular bag, in a bag tracking scheme. This would avoid the problem of having to pay for deposit refunds on bags where no deposit was actually paid in that jurisdiction, and verify the correct deposit to be paid.

However, even with a bar code scheme, each bag would have to be individually scanned, which once again presents a time and labor dilemma, once again reiterating the need for a scanning option which would allow scanning of crumpled up bags stuffed, in plurality, in a single bag.

Thus, in the preferred, RFID embodiment of the present system, an automated recycling bin system is also provided in the present system, wherein there is provided a container for receiving a bulk amount of uncounted bags having RFID tags thereon, container configured to scan and automatically count each bag in the bulk of bags, discerning data on the bags including deposit information, which is used to calculate a deposit refund for refunding to the customer.

The present system thereby provides an automated system for tracking and recycling of bags which is entirely automated and which is reliable, cost effective, and environmentally sound.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein:

FIG. 5 is a side view of the recycling container of FIGS. 2 and 3, illustrating the false bottom of the receiving area opening to allow the scanned bags to be collected in a bin or the like.

DETAILED DISCUSSION OF THE INVENTION

Figure 1:
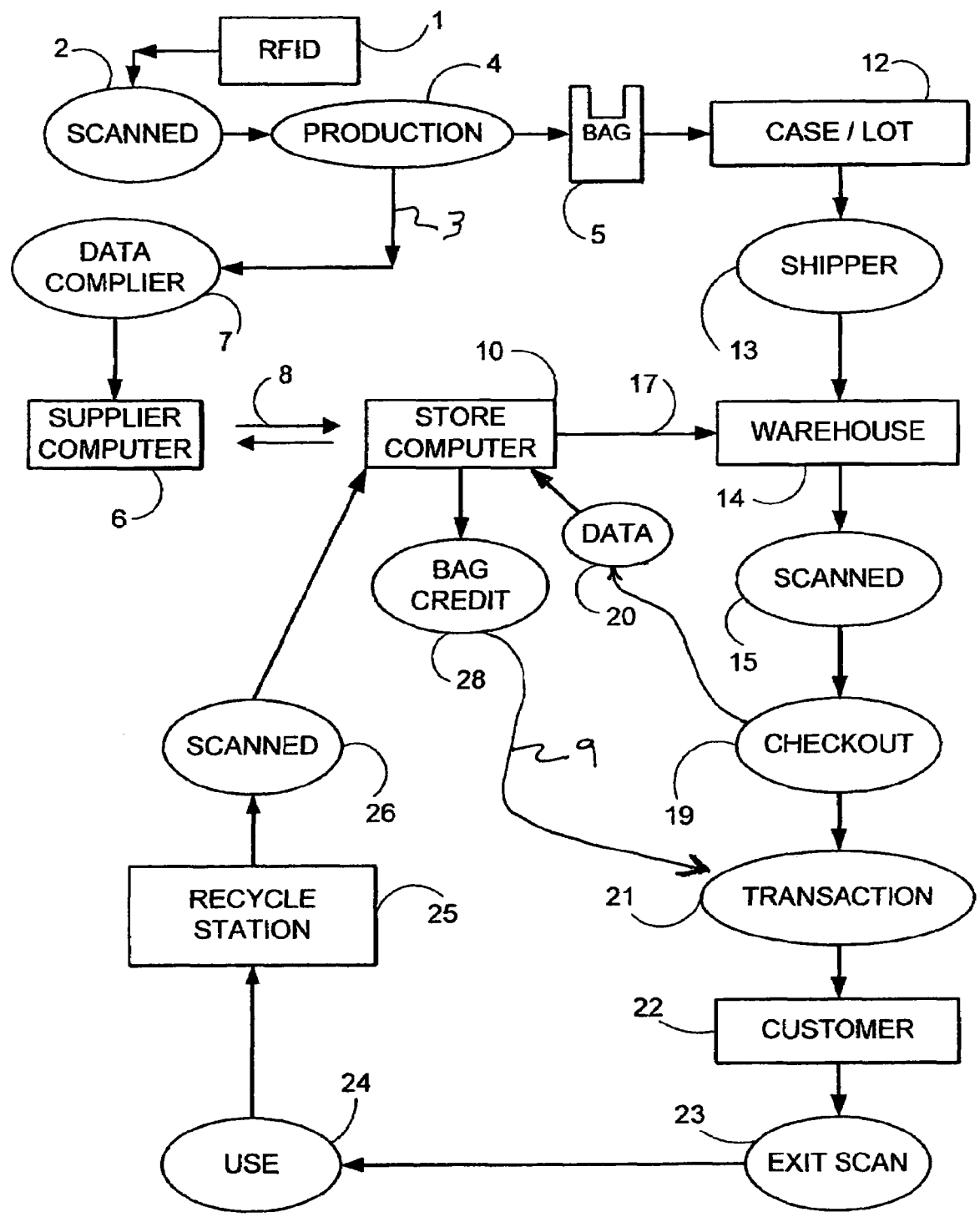
FIG. 1 is a flow chart illustrating the method of the preferred embodiment of the present invention.

Referring to FIG. 1 of the drawings, radio frequency ID Tag 1 having a unique code (ID tag number) is scanned 2 by an RFID scanner to determine the id tag number.

The RFID tag is preferably physically formed with (i.e., incorporated into the film) or attached (i.e., by heat melt welding, adhesive, or other adhesion means) to a bag 5 during production 4. Production data 3 on the formed bag 5 is then compiled 7, which includes the id tag number associated with the bag as well as other data, which may include lot information derived from other sources, including customer, date of manufacture, specifications, projected date of delivery, date of projected use, store location or other instructions by the store, manifest data, so as to provide bag data, which bag data is directed to, processed by, and stored on the supplier computer 6 (the compiler can be part of said computer). The bag data is then communicated 8 to the store computer 10 (the entity or an affiliate thereof utilizing the bags in the retail operation), for retrieval 17 by the store warehouse 11.

At the production facility, the bag 5 is processed into a case or lot 12, which is shipped 13 via shipper to the store warehouse 14, where may be remotely scanned 15 (without removal from its packing), to retrieve the RFID tag numbers, which numbers are associated with the bag data retrieved 17 from the store computer, and warehouse information including the bag data which can include verification inventory of the received bags, actual date time of delivery, receiver, storage location, condition, etc can be sent 16 to the store computer 10 to be associated with the bag data and appended to same for subsequent use and retrieval as required.

Information retrieved 17 from the store computer is then used by the warehouse to supply bags 18 to the retail checkout stations for use during checkout 19, preferably utilizing just in time supplier techniques.

After the bags have been supplied to the checkout station, during checkout 19, the cashier packs goods in each bag, often individually, which bag may be scanned as it is removed from the bagging area and placed in the grocery cart. The scanner may be associated with the bag rack and be initiated as the bag is removed form the rack via proximity sensors or switches (see FIG. 6), or it may be actuated by placing the bag upon a counter surface prior to placing in the grocery cart. Alternatively, the bag may be scanned as it is placed in the cart.

Transaction data 20 on the amount of bags used to complete checkout, as well as other possible data, including the customer identity where available, is sent to the store computer 10, which determines any possible surcharges or credits, including possible deposits fees on the amount of bags used, which additional fees and/or credit(s) 28 are sent to be added 9 to the transaction 21 for a final transaction tally, comprising the price of the goods with taxes, plus the automated calculation by computer of the deposit charge for bags used in the transaction, less credit for bags returned for deposit, which is paid by the customer 22. In addition to the scanner scanning the bag as it is removed from the rack, the contents of each scanned bag can be tracked for security and verification of proper filling of the bags by the party operating the checkout counter.

After the transaction 21 has occurred (i.e. the customer has authorized payment or otherwise has become obliged to pay the store or vendor), the customer 22 receives the cart with the bags and product, which may then be scanned one last time at the exit 23 of the establishment for security purposes, as it indicates when the customer left the store, as well as the number of bags in the cart.

The cart may have an RFID tag as well identifying when the cart entered the store, the path it took about the store (via an array of RFID sensors situated about the store), and when it left the store for marketing, customer profile, and security information, which information can be associated with the customer upon identification of the customer, typically at the transaction 21.

The bags are then removed by the customer from the area, and used 24 to convey the bags to the customer destination. Once used, the bags may be consolidated into a one or more bags, and are taken to a recycle station 25, which may be at the store. The bags are scanned 26 at the recycle station, which determines the ID tag number for each bag, which is associated with the bag information on the store computer 10 to determine a bag credit 28, which is applied at the customer's next transaction 21 at the store during checkout 19. Alternatively, the bag credit can be paid to the customer by the store, or a credit can be applied to an account (i.e., credit card, bank account) as indicated by the customer.

Figure 3:
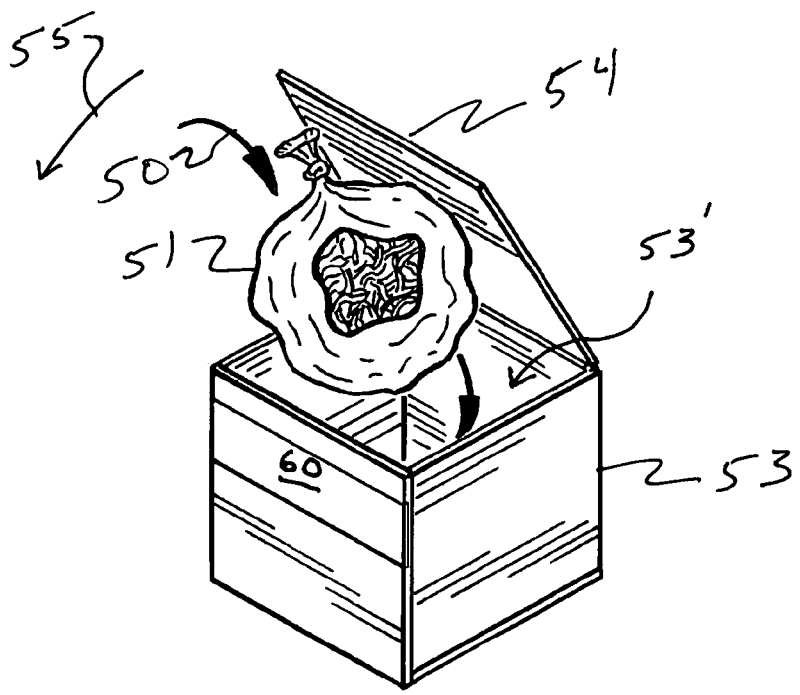
FIG. 3 is an isometric view of the upper, receiving area of a recycling container, illustrating the lid being lifted and a collection of bags within a bag being placed therein.
Figure 4:
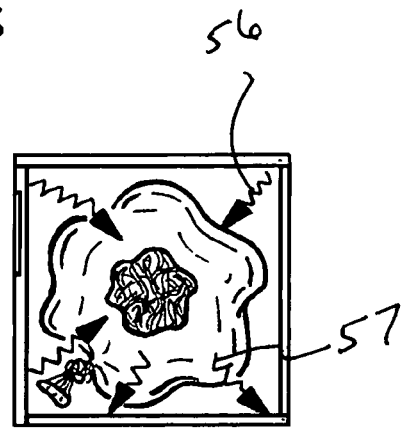
FIG. 4 is aside view of the recycling container of FIG. 3, illustrating scanner means being utilized to scan, count, and discern data on the number and identity of the bags within the receiving area.
Figure 5:
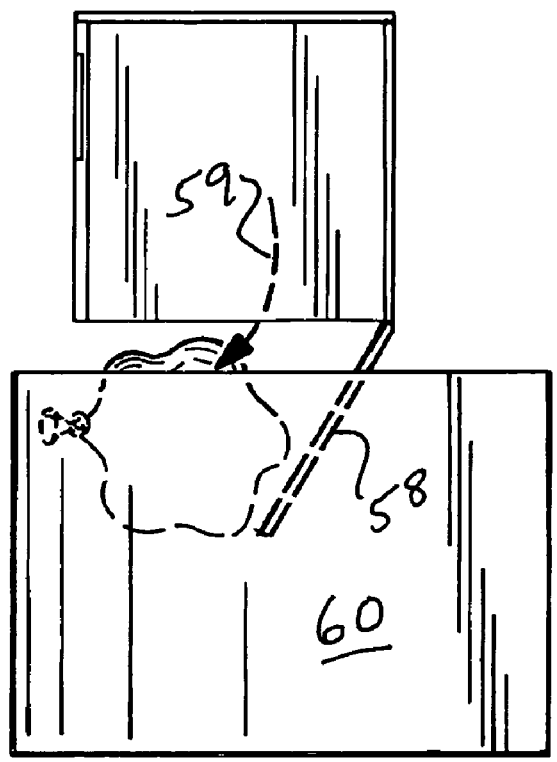

FIGS. 3–5 illustrate an embodiment of the recycle station of the present invention. In use, the customer places 50 a quantity of bags 51 (which can comprise a plurality of bags 52 situated in a disorganized fashion within or more bags) in an receiving bin 53. The bin 53 may have an interior space 53' sized to accommodate a pre-determined amount of bags, to insure operation within the scanner's capabilities, or maintain the bag lots being scanned within criteria established for the recycling operation.

A lid 54 may be provided which may have a switch associated therewith to initiate the system upon closing 55 of the lid with the bags therein. An RFID scan 56 of the contents of the upper bin is then made to discern the ID tag numbers of each bag is then made (FIG. 4) and the total number of RFID tags within the receiving bin to calculate the total number of verifiable bags within the bin.

This scan can be initiated by a button or switch initiated by the user, as indicated, by the act of closing the lid, or via proximity sensor. Once the scan 56 has completed, and the transponder or RFID data 57 received, the bottom of the upper bin can be formed to open 58 to allow the bags to fall 59 through to a lower storage area 60 (FIG. 5). The storage area may be in the form of a lower storage bin (not shown) for storage of the scanned, returned bags.

Alternatively, a chute, conveyor or modular, wheeled bin may be used to store the returned bags.

Once scanned, an indicator light or other means such as visual or audio indicia is provided to indicate to the customer that the scan has been completed. Other indicia, including a printed receipt or message display 60 can be provided to indicate to the customer transaction information. The receipt may include, for example, a bar code which could be utilized to apply a credit for any returned deposit on the bags, or obtain a refund on same.

As an alternative to a trap door or other automated removal of the bags from the receiving bin, a confirmation light, sound, display, or other indicia can be initiated to inform the bin operator that the scan has been completed, at which point the scanned bags can be removed from the recycling bin, to be placed in a collection or storage area.

Figure 2:
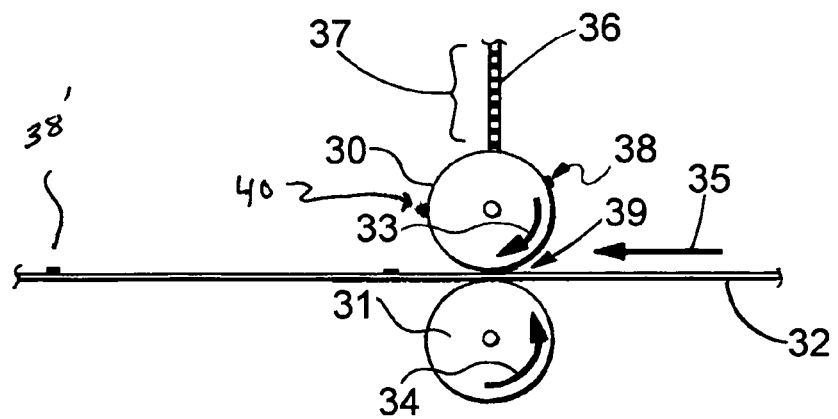
FIG. 2 is a side view of an exemplary embodiment of an RFID tag dispensing system for dispensing and affixing an RFID tag to a length of plastic film.

FIG. 2 indicates an example of a device to apply the RFID tag to the film web used to form the bag. As shown, upper 30 and lower 31 rollers, which can be rollers situated in the vicinity of the bubble extrusion device to form the film, have a film web 32 running therebetween, such that the rollers rotate 33, 34 with the progression 35 of the film therethrough. A dispenser 36 in the form of a slotted, gravity or spring fed magazine or the like having a plurality of RFID tags 37 situated therein sequentially deposits a tag 38 on the drum as it rotates, which tag is engaged to the film web as it passes between 39 the rollers.

The tag is positioned and spaced on the film web such that subsequent cut-out and forming of the bag by the bag making machine includes preferably a single RFID tag thereon in a generally uniform position, for example, the side gusset or bottom of the bag.

The dispenser may be triggered to deposit the single RFID on the film web by a notch or tooth 40 situated upon the drum, or by a mark upon the drum with sensor associated with the dispenser 36, or via communication with the device driving rollers 33,34. The sensor 38' may be pressure fused to the film 32 by its passing through the rollers, may be heat applied to the film, or may utilize adhesive or other means known in the art.

It is further anticipated that the rollers 30, 31 can be part of a printer drum assembly, and be driven by a printer, such that the RFID tags are applied to the film at the time of the printing of the film used to form the bags. It is also anticipated that an alternative means of attachment of the RFID tags utilizing the printer drums could entail mixing the RFID tag with the ink and applying the tag via the ink to the film as part of the printing process.

Alternative RFID application devices could be associated with the bag cut-out machine, the bag pack forming machine, or the like.

Further, heat resistant RFID tags could be mixed with the resin prior to film formation, and extruded with the resin via bubble extruder to the like such that the RFID tag is embedded into the film web.

Figure 6:
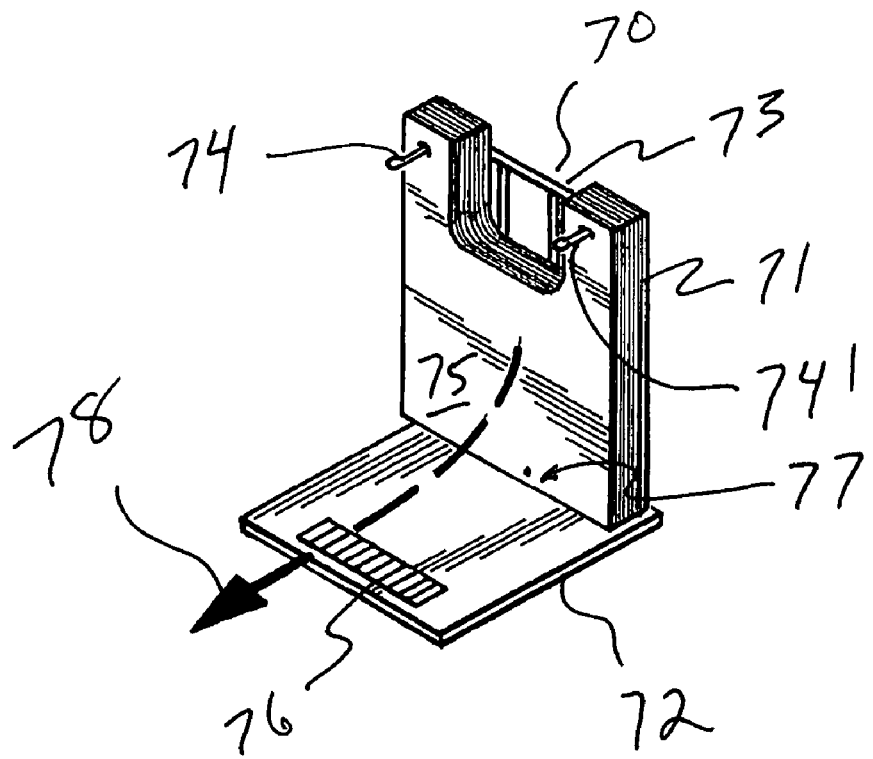
FIG. 6 is an isometric view of the preferred bag rack of the present invention, wherein there is provided a sensor in the base, which may be in the form of an RFID scanner, weight, proximity, movement, or other sensor for detecting removal of a loaded bag from the rack.

FIG. 6 illustrates an exemplary bag rack 70 for supporting a pack or stack of bags 71, the rack having a base 72 and vertical support 73, the vertical support having generally horizontally disposed, spaced horizontal support members 74, 74' for supporting the stack of bags 71. A sensor 76 is provided to detect an RFID tag in its immediate vicinity, for example, within 0–4 inches therefrom.

As discussed earlier in this application, an embodiment of the present invention which would not require RFID tags or sensors can utilize a sensor 76 comprising a pressure switch or the like (which may likewise be positioned at the base 72 of the rack 70), to detect removal of the filled bag 75 from the rack, which data is communicated to the computer (10 in FIG. 1) to allow the system to compile the number of bags per customer per transaction. Accordingly, this alternative system, like the previous embodiment, likewise provides a means of counting the bags as they are removed from the rack, and compiling the number of bags used per customer per transaction.

In use, the next bag 75 to be dispensed from the stack is opened on the rack and filled, then removed 78 from the rack, in the process dragging or maneuvering the bottom of the bag over the sensor 76, which detects the filled bag, and communicates that detection to the computer, which is used to provide a bag count associated with the transaction, or other use as disclosed herein. Said count may be used, for example, to calculate total deposit to be charged to the customer for bags used, or, for verification of proper filling of the bags by the party operating the checkout counter.

Other sensors which may be utilized in this capacity could include, for example, a proximity switch, a switch associated with the support arm on the rack, or other means to discern removal of a bag from the rack (of which there are several), which is counted by a computer.

A summary of a method utilizing the above non-RFID embodiment may comprise, for example:

A method of determining the amount of grocery bags utilized in a retail transaction, comprising the steps of:

a) providing a bag stack comprising a plurality of bags removably affixed to one another in uniform registration, b) providing a bag rack comprising a base and a vertical support, said base having associated therewith a sensor;

c) mounting said bag stack upon said bag rack such that said bag stack is supported in substantially vertical orientation by said rack;

d) opening a bag from said bag stack upon said rack, and placing product therein, providing a filled bag;

d) removing said filled bag from said rack; while e) utilizing said sensor to detect said bag as it is removed from said rack, so as to provide sensor detection;

f) communicating said sensor detection to a computer, said computer utilizing said sensor detection to count said bag, so as to provide a bag count;

g) repeating steps b–f until said retail transaction is complete, providing a final bag count; and h) associating said final bag count with said transaction.

As discussed above, the above referenced sensor may comprise, for example, a pressure switch or the like associated with the base of the rack, or a proximity switch.

In use, the next bag 75 to be dispensed from the stack is typically opened on the rack and filled, then removed 78 from the rack, in the process dragging or maneuvering the bottom of the bag over the sensor 76, which detects the RFID tag 77 affixed to each bag, in the present example, preferably in the lower region of the bag. The sensor then communicates the information on the RFID tag to the store computer, which is associated with the ongoing transaction and may be used to calculate a deposit surcharge or other use as disclosed supra.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A system for tracking thermoplastic bags at a retail establishment having a check out area, comprising:
   a plurality of bags removeably affixed to one another in uniform registration to form a bag stack, each of said bags having an transponder;
   a bag rack formed to engage and support said bag stack;
   a sensor having a range situated in the vicinity of said bag rack;
   whereby, upon opening and filling a bag from said bag stack and removing said bag from said bag stack and said bag rack, said transponder on said bag is positioned within the scanning range of said sensor, so as to allow said sensor to detect said transponder and thereby discern data on said bag.

2. The system of claim 1, wherein said bag is a t-shirt grocery bag.

3. The system of claim 2, wherein said bag rack further comprises a base having a vertical support emanating therefrom, said vertical support formed to support said stack of bags in substantially vertical orientation, and wherein said sensor is situated in the vicinity of said bag rack.

4. The system of claim 3, wherein each of said bags forming said bag stack has a lower region, said transponder comprises an RFID tag, said RFID tag situated in said lower region of each of said bags forming said bag stack.

5. The system of claim 4, wherein there is further provided a computer formed to receive data from said sensor so as to count each bag as it is removed from said rack.

6. A system for tracking bags, comprising:
   a filled bag stuffed with a plurality of like bags, each said bag having an RFID tag associated therewith having deposit data associated with a retail transaction therein;
   a bin having a receiving area having an RFID sensor associated therewith;
   said bin further comprising an interface to communicate information from said RFID sensor;
   whereby, upon said filled bag being placed in said receiving area of said bin, said RFID sensor is formed to simultaneously scans said receiving area to discern RFID data on all said bags, and wherein said interface is formed to communicate deposit data associated with said RFID data to a computer so as to facilitate a credit associated with a retail transaction.

7. The system of claim 6, wherein said bin is a recycling bin.

8. The system of claim 7, wherein there is provided a plurality of bags having RFID tags individually situated therein, and wherein, upon said plurality of bags being placed together in said receiving area of said bin, said RFID sensor scans said receiving area to discern RFID data on each of said bags.

9. The system of claim 8, wherein said bags comprise thermoplastic grocery bags.

10. The system of claim 9, wherein said thermoplastic grocery bags comprise t-shirt bags.

11. The method of utilizing t-shirt grocery bags, comprising the steps of:
    a. providing a plurality of RFID tags, each having distinct RFID data;
    b. applying each said RFID tag to a web of film in uniformly spaced fashion;
    c. forming a t-shirt bag from said web of film such that a single RFID tag is associated with said bag;
    d. repeating step "c" to provide a plurality of said T-shirt bags, each having an RFID tag associated therewith;
    e. stacking said plurality of T-shirt bags in uniform registration to form a stack;
    f. removeably adhering said T-shirt bags in said stack together to form a bag pack;
    g. sequentially separating a bag from said unitary bag pack, providing a dispensed bag;
    h. scanning said RFID tag on said dispensed bag as it is separated from said bag pack providing RFID data;
    i. repeating steps "g" and "h" until all of said bags are dispensed from said bag pack; and
    j. utilizing said RFID data on each dispensed bag to track bag usage.

12. The method of tracking a bag, comprising the steps of:
    a. forming a bag having an RFID tag associated therewith, said RFID tag having RFID data;
    b. repeating step "a" to form a plurality of bags;
    c. stacking said plurality of bags in substantially uniform registration to form a stack;
    d. removeably adhering said stack to form a baa pack;
    e. removing a bag from said bag pack;
    f. scanning said bag during a transaction wherein said bag has product placed therein, and utilizing said RFID data to calculate a deposit amount charged as a component of said transaction;
    g. scanning said bag after use, and utilizing said RFID data to calculate a credit based upon the deposit amount charged.

13. The method of recycling a grocery bag, comprising the steps of:
    a) forming a stack of bags, each bag having an RFID tag having RFID data;
    b) placing said stack of bags upon a bag rack;
    c) opening one of said bags upon said rack, and placing product therein, providing a filled bag;
    d) removing said filled bag from said rack;
    e) scanning said filled bag as it is removed from said rack, providing RFID data on said bag;
    f) utilizing said RFID data to calculate a deposit on said bag, which deposit is charged to a customer;
    g) providing said bag to said customer;
    h) utilizing said bag to convey said product;
    I) emptying said bag of said product, providing a used bag;
    j) utilizing an RFID scanner to scan said used bag, providing RFID data on said bag;
    k) utilizing said RFID data to calculate a credit based upon said deposit.

14. The method of claim 13, wherein in step "j" there is further provided the steps of:
  I. providing a recycling bin having a receiving area having an RFID scanner associated therewith;
  ii. placing said bag into said receiving area of said recycling bin;
  iii. utilizing said RFID scanner to scan said receiving area, receiving RFID data on said bag situated within said receiving area.

15. The method of claim 14, wherein said recycling bin has a lid covering said receiving area, and wherein there is further provided the steps of:
  ia. providing a switch associated with said lid, said switch associated with said RFID scanner, said switch configured to initiate scanning of said receiving area by said RFID area for a predetermined period of time upon said lid closing upon said receiving area;
  ib. lifting said lid, depositing said bag into said receiving area;
  ic. closing said lid, utilizing said switch to initiate scanning of said RFID area.

16. The method of tracking a deposit on a grocery bag, comprising the steps of:
  a) forming a stack of bags, each bag having an RFID tag having RFID data;
  b) placing said stack of bags upon a bag rack;
  c) opening one of said bags upon said rack, and placing product therein, providing a filed bag;
  d) removing said filled bag from said rack;
  e) scanning said filled bag as it is removed from said rack, providing RFID data on said bag;
  f) utilizing said RFID data to calculate a deposit on said bag, which deposit is charged to a customer.

17. The method of claim 16, wherein after step "f" there is further provided the additional step "g" of utilizing said RFID data to count said bag.

18. The method of claim 17, wherein there is further provided after step "g" the additional step "h" of repeating steps c–g until said transaction is completed, so as to provide a full count of the bags utilized to complete said transaction.

19. The method of claim 18, wherein in step "h" there is further provided the step "h1" of communicating said full count of bags to calculate a deposit amount for said bags, which deposit amount is added to the amount paid in said retail transaction, providing a communicated count.

20. The method of claim 18, wherein in step "h" there is further provided the step "h1" of utilizing said communicated count to calculate the amount of bags utilized by the operator in completing said transaction.

21. A system for tracking bag usage, comprising:
  a plurality of bags removeably affixed to one another in uniform registration to form a bag stack, each of said bags having a transponder;
  a bag rack formed to removeably engage and suspend said stack of bags in a substantially vertical orientation, said back rack having a base;
  a sensor associated with the base of said bag rack;
  whereby, upon suspending said stack of bags on said bag rack then removing a bag from said stack of bags, said sensor is formed to disseminate data from said transponder on said bag.

22. The system of claim 21, wherein each said bag forming said bag stack is at-shirt grocery bag and said transponder is an RFID tag.

23. The system of claim 22, wherein said base of said bag rack has a vertical support emanating therefrom, said vertical support formed to support said stack of bags in a substantially vertical orientation, and wherein said sensor is situated in the base of said bag rack.

24. The method of determining the amount of grocery bags utilized in a retail transaction, comprising the steps of:
  a) providing a bag stack comprising a plurality of bags removably affixed to one another in uniform registration, each of said bags forming said stack having a transponder,
  b) providing a bag rack comprising a base and a vertical support, said base having associated therewith a sensor;
  c) mounting said bag stack upon said bag rack such that said bag stack is supported in substantially vertical orientation by said rack;
  d) opening a bag from said bag stack upon said rack, and placing product therein, providing a filled bag;
  e) removing said filled bag from said rack; while
  f) utilizing said sensor to detect said transponder associated with said filled bag, so as to provide sensor detection;
  g) communicating said sensor detection to a computer, said computer utilizing said sensor detection to count said bag, so as to provide a bag count;
  h) repeating steps b–g until said retail transaction is complete, providing a final bag count; and
  i) associating said final bag count within said transaction.

25. The method of claim 24, wherein in step "b" said sensor further comprises a pressure switch.

26. The method of claim 24, wherein in step "b" said sensor further comprises a proximity switch.

27. The method of claim 24, wherein in steps "a" and "f" said transponder comprises an RFID apparatus, and wherein in step "b" said sensor comprises an RFID sensor, and wherein in step "f" said RFID sensor detects said RFID apparatus.

28. The method of claim 27, wherein each said bag forming said stack in step "a" has a bottom, wherein in step "b" said RFID apparatus is situated in the vicinity of the bottom of each said bag forming said stack and said filled bag of step "d" has a bottom, and in step "e" said bottom of said filled bag is dragged over the sensor, so as to allow the sensor to detect said bag.

29. The method of claim 25, wherein in step "b" said sensor is situated on said base of said rack, each bag forming said stack has a bottom, and said filled bag of step "d" has a bottom, and in step "e" said bottom of said filled bag is dragged over the sensor, so as to allow the sensor to detect said bag.

30. The method of facilitating recycling of a grocery bag, comprising the steps of:
  a. forming a stack of bags, wherein each said bag has an RFID tag having RFID data;
  b. placing said stack of bags upon a bag rack;
  c. filling a bag from said stack of bags, providing a product filled bag;
  d. scanning said product filled bag as it is removed from said bag rack, providing said RFID data;
  e. utilizing said scan data to calculate a deposit;
  f. utilizing said filled bag, providing a used bag;
  g. scanning said used bag, providing said RFID data;
  h. utilizing said RFID data to provide a credit based upon said deposit.

* * * * *